United States Patent [19]

Crawford et al.

[11] Patent Number: 5,343,289
[45] Date of Patent: Aug. 30, 1994

[54] SPECTROMETER ASSEMBLY WITH POST DISPERSER ASSEMBLY

[75] Inventors: Richard L. Crawford, Attleborough; Garry C. Kunselman, Stow; Albert Angelucci, Billerica; Bruce C. Fitz-Patrick, Franklin; Richard S. Ferreira, North Dighton, all of Mass.

[73] Assignee: Thermo Jarrell Ash Corporation, Waltham, Mass.

[21] Appl. No.: 93,899

[22] Filed: Jul. 20, 1993

Related U.S. Application Data

[63] Continuation of Ser. No. 840,403, Feb. 24, 1992, abandoned.

[51] Int. Cl.⁵ .................................................. G01J 3/20
[52] U.S. Cl. .................................................... 356/328
[58] Field of Search ................. 356/306, 307, 310, 326, 356/328, 330, 334

[56] References Cited

U.S. PATENT DOCUMENTS

| 3,563,654 | 2/1971 | Vermande . | |
|---|---|---|---|
| 3,680,957 | 8/1972 | Fukuda . | |
| 4,068,954 | 1/1978 | Da Silva . | |
| 4,245,911 | 1/1981 | Steinbrenner | 356/328 |
| 4,371,263 | 2/1983 | Witte | 356/333 |
| 4,636,074 | 1/1987 | Levy | 356/328 |
| 4,697,924 | 10/1987 | Akiyama | 356/333 |
| 4,844,617 | 7/1989 | Kelderman et al. | 356/328 |

FOREIGN PATENT DOCUMENTS

| 0282043 | 9/1988 | European Pat. Off. . | |
|---|---|---|---|
| 3606533 | 9/1987 | Fed. Rep. of Germany . | |
| 57-69220 | 4/1982 | Japan | 356/334 |

OTHER PUBLICATIONS

Saunderson et al, *Journal of the Optical Society of America*, vol. 35, No. 11, Nov. 1945, pp. 681–697.

Barth, "High-transmission 20-channel polychromator for observing non-Maxwellian electron velocity distributions in plasmas by Thomson scattering", Applied Optics, vol. 27, No. 14, Jul., 1988, pp. 2981–2986.

*Primary Examiner*—F. L. Evans
*Attorney, Agent, or Firm*—Fish & Richardson

[57] ABSTRACT

A spectrometer system with structure defining an entrance aperture, dispersing structure, structure defining a plurality of exit apertures, detector structure associated with each exit aperture and a post disperser assembly disposed between an exit aperture and its detector structure.

20 Claims, 5 Drawing Sheets

PRIOR ART

PRIOR ART

SPECTROMETER ASSEMBLY WITH POST DISPERSER ASSEMBLY

This is a continuation of application Ser. No. 07/840,403, filed Feb. 24, 1992, now abandoned.

This invention relates to the field of spectrometry.

BACKGROUND OF THE INVENTION

When an element is heated or otherwise energetically excited, it emits radiation at a set of wavelengths or spectral lines which are characteristic of that particular element, and is termed its emission spectrum. A particular emission spectrum is the signature of a particular element. A material, which is composed of a number of elements and which is heated or otherwise energetically excited, will produce an emission spectrum which is equal to the sum of the emission spectra of all the elements of which the material is composed and one can ascertain the elemental composition of a material by determining the material's emission spectrum.

An emission spectrometer excites a material and then separates (disperses) radiation emitted from the material into the spectra of the elements which make up the material. Radiation can be dispersed by various means including refraction and diffraction. Modern spectrometers typically use a diffraction grating as the dispersive element to separate the various component wavelengths of light. A diffraction grating typically comprises a reflective or transmissive substrate in which a series of grooves have been formed or a surface onto which a series of holographic fringes have been recorded. In either case, the fringes or the grooves are regularly spaced and cause radiation of different wavelengths to destructively or constructively interfere as a function of the wavelength of radiation, the separation of the grooves or fringes and the angle at which the radiation impinges upon and is reflected from the grooves or fringes. The relationship which determines which wavelengths are selected to undergo constructive interference is termed the grating equation and is given by:

$$n\lambda = d\ SIN\ \Theta \pm d\ SIN\ \Theta'$$

where n is the order, which is equal to one for the fundamental order, $\lambda$ is the wavelength; d is the spacing between the grooves or fringes, $\Theta$ is the angle at which the light is incident upon the grating and $\Theta'$ is the angle at which the light is diffracted from the grating. By knowing the groove spacing and the incident angle, one can calculate the wavelength which is constructively diffracted by the grating at a particular angle.

Although a set of wavelengths uniquely defines a given element, a particular spectral line may be produced by different elements. Further, several elements within a material may produce spectral lines which, although are not at the same wavelength, may be close to one another. The ability to separate two or more closely spaced spectral lines is termed the resolving power of the spectrometer.

Although diffractive dispersion elements have attributes which are shared by refractive dispersive elements, such as prisms, diffractive elements also possess a property not shared by refractive elements, that is, they produce different harmonics or integer multiples (n>1) of the grating fundamental (n=1) wavelength satisfying the grating equation. This property results in the constructive interference of wavelengths which are multiples, termed higher orders, of the fundamental wavelength, as well as the fundamental wavelength. When it is desired to measure the intensity of a secondary wavelength, a fundamental line of strong intensity may obscure a higher order line, thereby preventing its measurement.

To separate the fundamental wavelength from other orders, bandpass filters have been used to allow only those wavelengths of light which fall within a certain band of wavelengths, as determined by the filter, to pass. These filters typically reject or prevent most of the light of wavelengths outside the pass band; allowing only $10^{-3}$ to $10^{-4}$ of the intensity incident upon the filter to pass through. Such filters are usually classed as wideband or narrowband filters, depending upon the range of wavelengths the filter allows through. Wideband filters typically pass a wide range of wavelengths but are generally not available for filtering below 300 nanometers. Narrowband filters typically pass a narrow range of wavelengths, for example a range of 10–20 nanometers, and are available for filtering below 300 nanometers, but are expensive and easily damaged. A second known method for separating fundamental and higher order wavelengths is the use of a "solar blind" photomultiplier tube. While this type of sensor is capable of rejection of the order of $10^{-4}$ to $10^{-5}$, it is expensive.

SUMMARY OF THE INVENTION

In accordance with one aspect of the invention, there provided a spectrometer system with structure defining an entrance aperture, dispersing structure, structure defining a plurality of exit apertures, detector structure associated with each exit aperture and a post disperser assembly disposed between an exit aperture and its detector structure. The post disperser assembly improves spectrometer sensitivity and permits use of less expensive detectors, by "filtering" or separating radiation at fundamental wavelengths from that of higher order wavelengths, and also by reducing background radiation.

Preferably, the post disperser assembly includes a reflective diffraction grating disposed adjacent the exit aperture and mask structure disposed between the diffraction grating and its detector structure, the grating having a radius of curvature in the range of five-fifty centimeters. Adjustment structure for moving a component of the post disperser assembly relative to its detector structure for changing the wavelength of radiation dispersed by the post disperser assembly that is sensed by its detector structure, in one embodiment is operable to move the diffraction grating relative to the detector structure, and in another embodiment is operable to move the mask structure relative to the detector structure.

In accordance with another aspect of the invention, there is provided a spectrometer system with housing structure, entrance aperture defining structure in the housing structure for passing a beam of radiation from sample material excited to spectroemissive levels, dispersing structure in the housing for dispersing radiation in the beam into a spectrum, structure in the housing defining a plurality of exit apertures, detector structure associated with each exit aperture structure, and a post disperser assembly in the housing disposed between the exit aperture and its detector structure, the post disperser assembly including a curved reflective diffraction grating, and structure for selecting a portion of the wavelength of radiation directed by the diffraction grating to its associated said detector structure.

In a particular embodiment, a spectrometer includes a Paschen-Runge mount in which diffracted radiation is directed to a plurality of exit slits at locations on a Rowland circle corresponding to predetermined wavelengths. Positioned at each of a predetermined number of the exit slits is a post disperser assembly. Each post disperser assembly includes a support adjacent an exit slit of the spectrometer; a photomultiplier tube mounted on the support, a concave post disperser reflective diffraction grating disposed between the exit slit and the photomultiplier tube for dispersing different wavelength orders of radiation passing through the exit slit; and apertured mask structure positioned between the post disperser grating and the photomultiplier tube for permitting a particular portion of the diffracted light reflected by the concave reflective diffraction grating to reach the photomultiplier tube. The mask structure includes a tubular outer member with aligned apertures in opposed lower and upper surfaces, a mask member disposed within the outer member with an aperture of a length shorter than the length of the apertures in the tubular outer member, biasing structure secured to the mask member, and selecting structure including an adjusting screw for moving the mask member relative to the tubular outer member to shift the position of its aperture relative to the detector structure. The grating is a holographic grating with at least one thousand fringes per millimeter and a radius of curvature in the range of five-fifty centimeters, and the system includes bracket structure for supporting the grating and the photomultiplier tube, the bracket structure including a slot in its front wall and a transverse through aperture rearwardly of the slot that has a curved front surface against which the grating is seated.

BRIEF DESCRIPTION OF THE DRAWINGS

Other features and advantages of the invention will be seen as the following description of particular embodiments progresses, in conjunction with the drawings, in which.

DESCRIPTION OF PARTICULAR EMBODIMENTS

Figure 1:
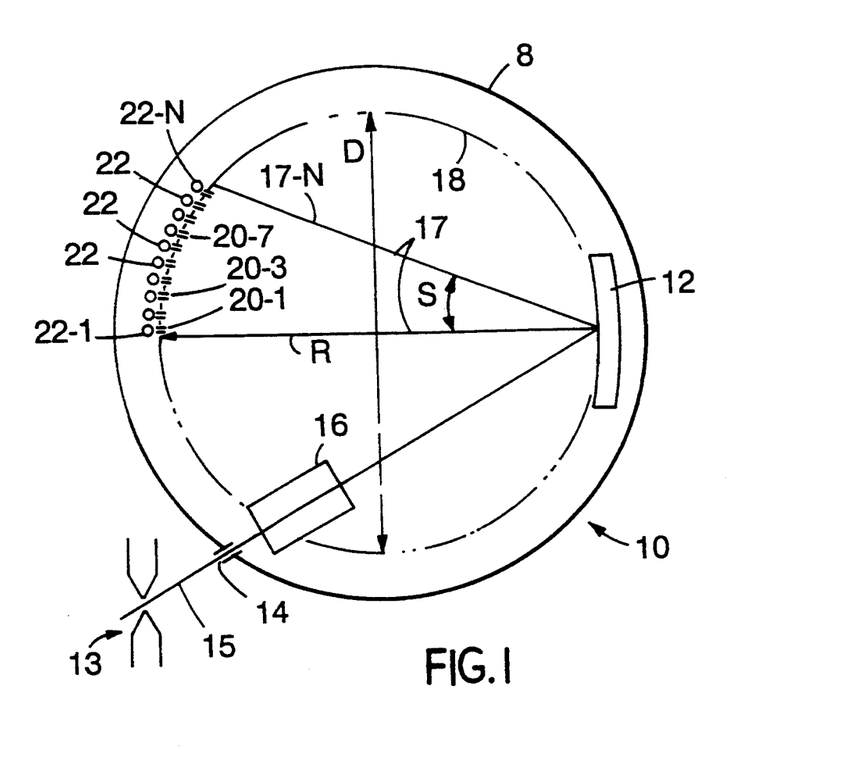
FIG. 1 is a schematic diagram of an emission spectrometer in accordance with the invention.
Figure 2:
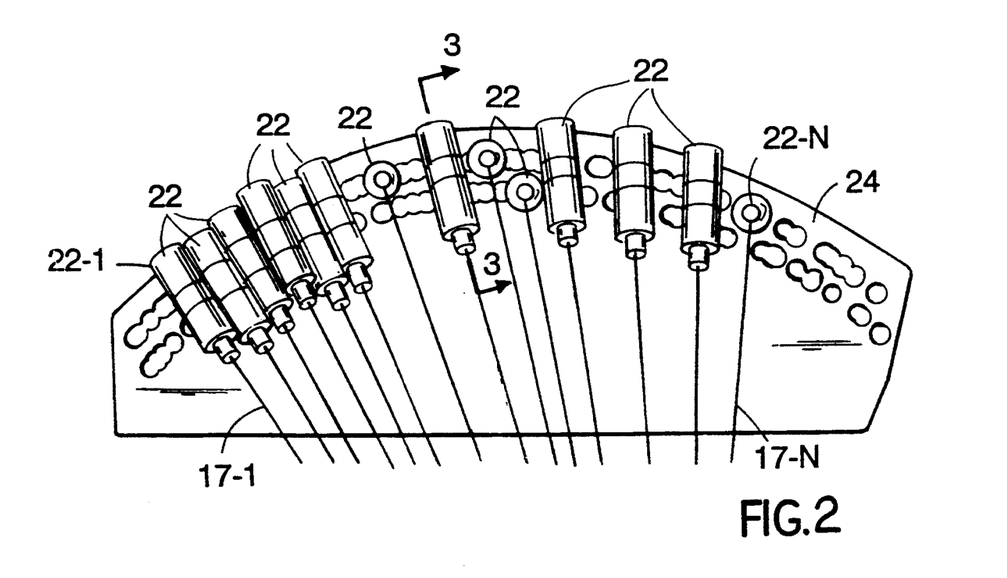
FIG. 2 is a diagrammatic view of focal curve structure in the spectrometer of FIG. 1.

A 0.75 meter polychromater 10 of the Paschen-Runge type is shown schematically in FIG. 1. Mounted in the housing (diagrammatically indicated at 8) of polychromater 10 is dispersive element 12 in the form of a concave holographic reflection grating that has 24,000 fringes per millimeter and a focal length of 751 millimeters. A suitable source 13 (such as a spark, an arc, a laser microprobe or an induction coupled plasma) energizes the material to be analyzed and the resulting radiation enters the housing 8 of polychromater 10 through twenty-five micrometer wide entrance slit 14. The entering radiation beam 15 passes through spectrum shifter 16 and impinges on concave diffraction grating 12 which disperses the incident radiation in a spectrum of beams 17 over arc S to an array of spaced exit slits 20-1-20-N located on Rowland circle 18, different wavelengths being dispersed at different angles from grating 12 in accordance with the grating equation. Rowland circle 18 is tangent to the midpoint of diffraction grating 12, and the diameter D of Rowland circle 18 is equal to the radius of curvature R of grating 12. A corresponding detector 22-1-22-N is associated with each exit slit 20. Each exit slit 20 has a width of fifty micrometers and a height of eighteen millimeters, and each detector 22 is an R300 photomultiplier tube that is mounted adjacent its exit slit 20 on focal curve structure 24 (FIG. 2). As indicated diagrammatically in that Figure, each photomultiplier tube 22 is mounted either horizontally or vertically. A post disperser assembly 30 may be interposed between an exit slit 20 and its horizontally mounted detector 22.

Figure 3:
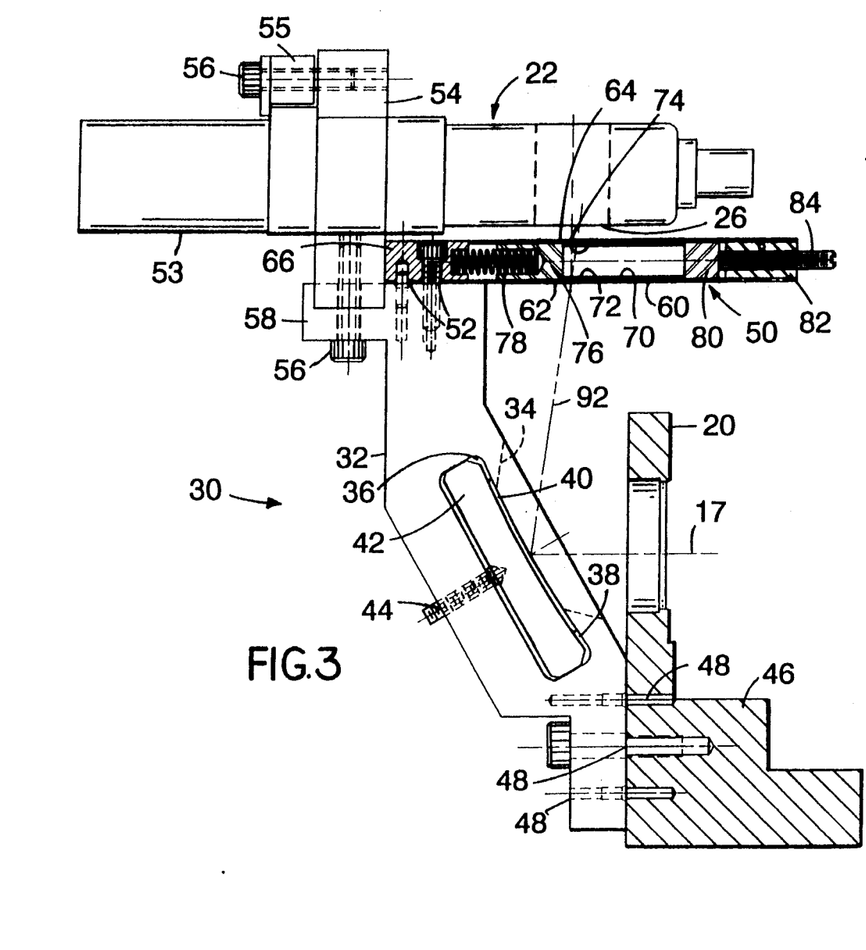
FIG. 3 is a sectional view taken along the line 3—3 of FIG. 2, showing details of a post disperser assembly employed in the spectrometer of FIG. 1.
Figure 4:
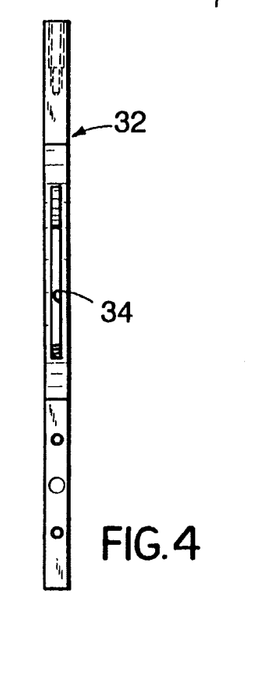
FIG. 4 is a front view of the bracket member employed in the post disperser assembly shown in FIG. 3.

With reference to FIGS. 3 and 4, disposed between such an exit slit 20 and its photomultiplier detector tube 22 is post disperser assembly 30 that includes brass support bracket member 32 that has a width of about four millimeters. As indicated in FIG. 4, a slot 34 in its front wall has a width of about two millimeters and an effective vertical height of about two centimeters. Formed rearwardly of aperture 34 is transverse through aperture 36 that has curved front surface 38. Two types of bracket members are employed in the system shown in FIG. 1, a tall bracket member that has a height of about seven centimeters and surface 38 of about thirty centimeters radius, and a short bracket member that has a height of about four centimeters with surface 38 having a radius of about sixteen centimeters, the radius of each curved surface 38 being such that radiation from beam 17 incident on grating 40 is focused on sensor region 26 of PMT 22. Seated against surface 38 so that its front surface conforms to the curvature of surface 38 is holographic reflection grating 40 that has 1,200 fringes per millimeter. Grating 40 is seated against surface 38 by clamp member 42 and screw 44. Bracket member 32 is mounted on slit member 46 by a combination of screws and pins 48, and slit member 46 is in turn mounted on focal curve structure 24 (FIG. 2).

Mounted on bracket 32 above post disperser grating 40 is adjustable mask structure 50 that is secured to bracket 32 by pin and screw members 52, and photomultiplier tube 22 is secured by tube holder 53, socket holder 54, cleat 55 and screws 56 to bracket flange 58.

Figure 3A:
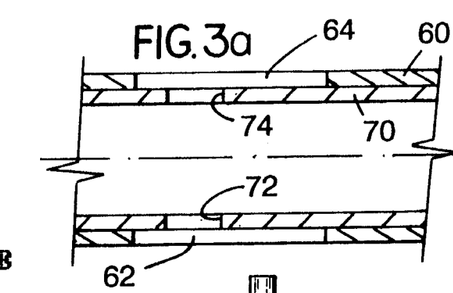
FIG. 3a is an enlarged diagrammatic view of a portion of mask structure employed in the post disperser assembly shown in FIG. 3.

With reference to FIGS. 3 and 3a, adjustable mask structure 50 includes rectangular outer tube 60 that has a dimension of about five millimeters on a side and has aligned apertures 62, 64 in its lower and upper surfaces, respectively, each aperture 62, 64 having a length (parallel to beam 17) of about eight millimeters and a width of about four millimeters. Tube 60 is mounted on the upper surface of bracket 32 by mask mounting block 66 and bolt and pin arrangement 52. Disposed within mask tube 60 is tubular inner mask 70 that has lower aperture 72 and upper aperture 74 (each of which has a width of about four millimeters and a length (parallel to beam 17) of about two millimeters). Secured to inner mask tube 70 is retainer 76 which carries compression spring 78 that is received in mounting block 66. At the opposite end of tube 70 is pusher member 80. Secured in outer mask tube 60 is adjusting block 82 which receives adjusting screw 84, an end of screw 84 abutting mask pusher 80. By rotation of adjusting screw 84, the axial position of inner mask 70 (and its apertures 72, 74) relative to the longer apertures 62 and 64 in outer mask 60 may be adjusted to shift the portion of sensor region 26 exposed to a portion of the spectrum from grating 40 (and thus select a particular wavelength to be detected).

In use, a beam 17 of diffracted radiation from grating 12 passes through exit slit 20 and impinges on post disperser grating 40 as indicated in FIG. 3 for dispersion into a spectrum. A portion of that spectrum indicated by line 92 passes through the mask apertures 62, 72, 74, 64 for impingement on the sensor region 26 of photomultiplier tube 22 such that a particular desired wavelength portion of the radiation diffracted from grating 40 is transmitted to detector 22.

In practice, it is not necessary to locate a post disperser assembly at each exit slit 20 of the polychromater 10 as not all spectral lines have second orders which correspond to first orders of other spectral lines. For example, erbium has a strong fundamental line at 463.088 nanometers which tends to obscure the second order of the 231.604 nanometer fundamental line of nickel. Therefore, a post disperser assembly is positioned at an exit slit corresponding to about 463 nanometers to separate the second order nickel line from the first order erbium line. Since no significant second order line falls near the 229.2 nanometer line of cobalt, it is not necessary to use a post disperser assembly at the exit slit 20 corresponding to the cobalt 229.2 nanometer line.

Figure 5A:
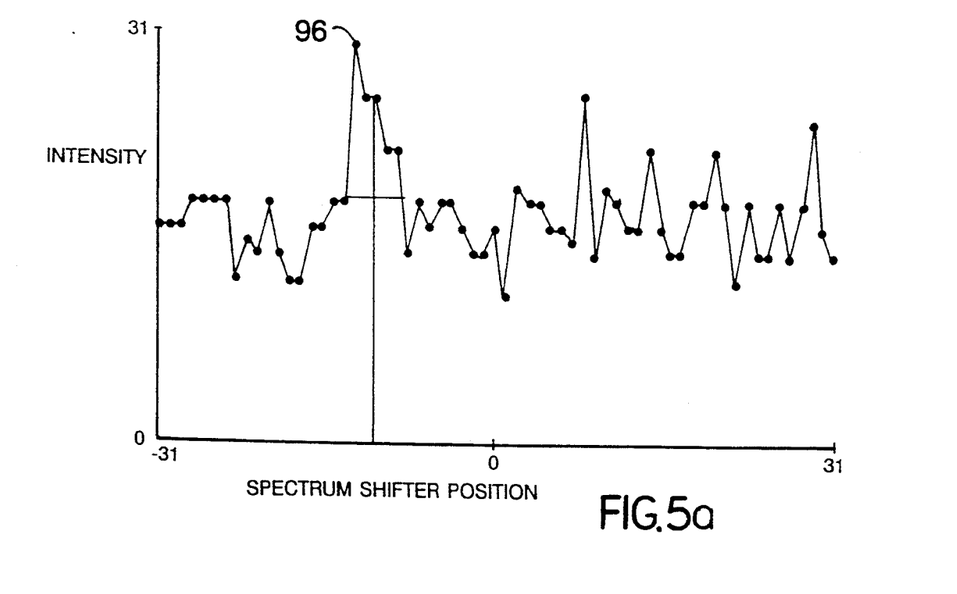
FIG. 5a is a graph of a spectroscopic scan employing an emission spectrometer of the type shown in FIG. 1 in which a post disperser assembly was included.
Figure 5B:
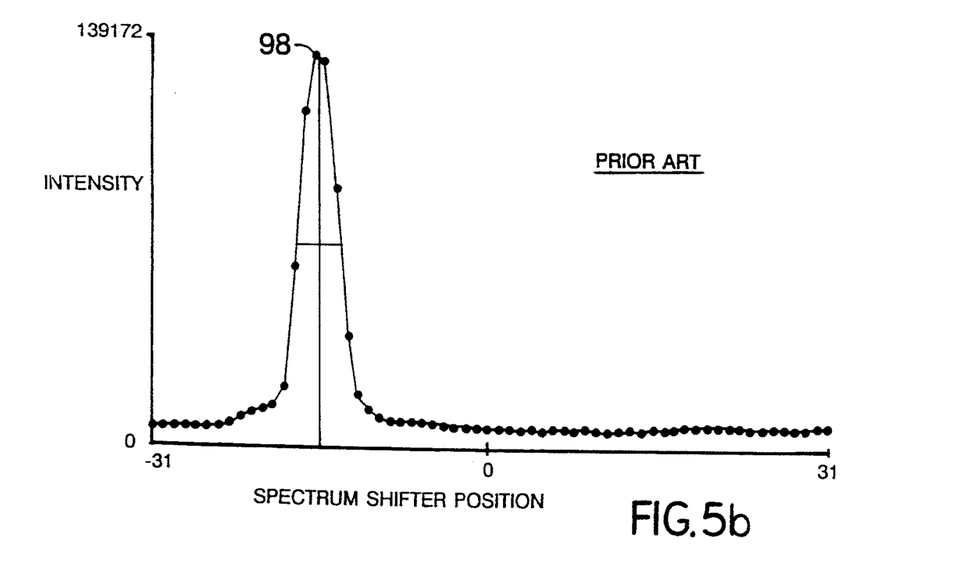
FIG. 5b is a graph of a spectroscopic scan at the same wavelength as the scan of FIG. 5a in which the post disperser assembly was omitted.

FIG. 5a shows a scan of a system with a post disperser assembly 30 interposed between the photomultiplier tube 22 and the exit slit 20 at about 463 nanometers. A sample of 1,000 PPM erbium was introduced, and a series of readings were made and recorded at different settings of spectrum shifter 16, including a peak reading 96 of 31 counts (15 counts above background). That peak 96 represents the portion of radiation from the erbium first order that was not rejected by the holographic post disperser assembly 30. Shown in FIG. 5b is a scan obtained at the exit slit at about 463 nanometers of a polychromater system that used an R300B photomultiplier tube with a planar mirror overhead arrangement but no post disperser assembly. Again, 1,000 PPM of erbia was introduced into the spark gap and a peak 98 of 126,141 counts was recorded. The rejection ratio (15/126141) equals about $1.1 \times 10^{-4}$ a rejection ratio equal to or better than the rejection ratio obtained in a prior art system using a solar blind R427 photomultiplier tube.

Figure 5C:
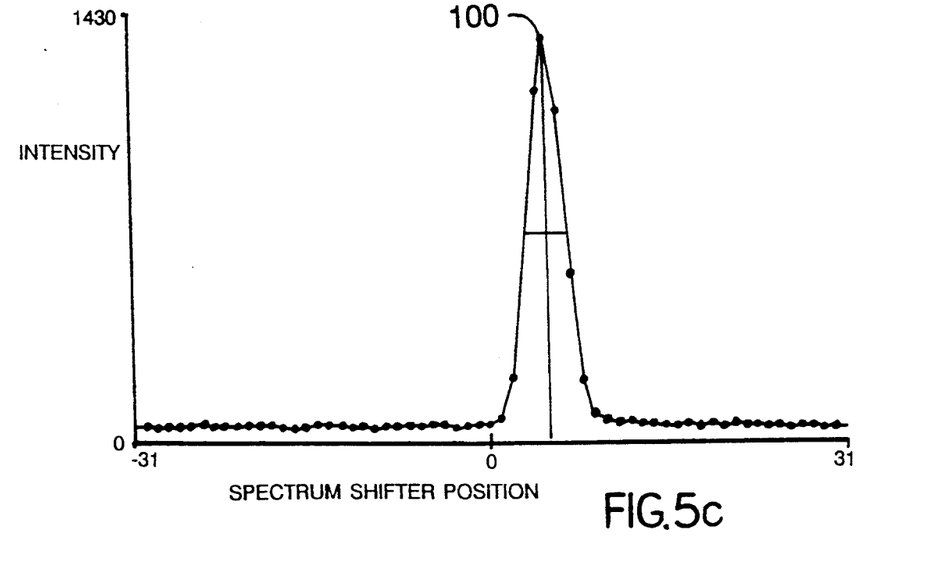
FIG. 5c is a graph of a spectroscopic scan of a sample at 231.6 nanometers with a system of the type shown in FIG. 1 in accordance with the invention.
Figure 5D:
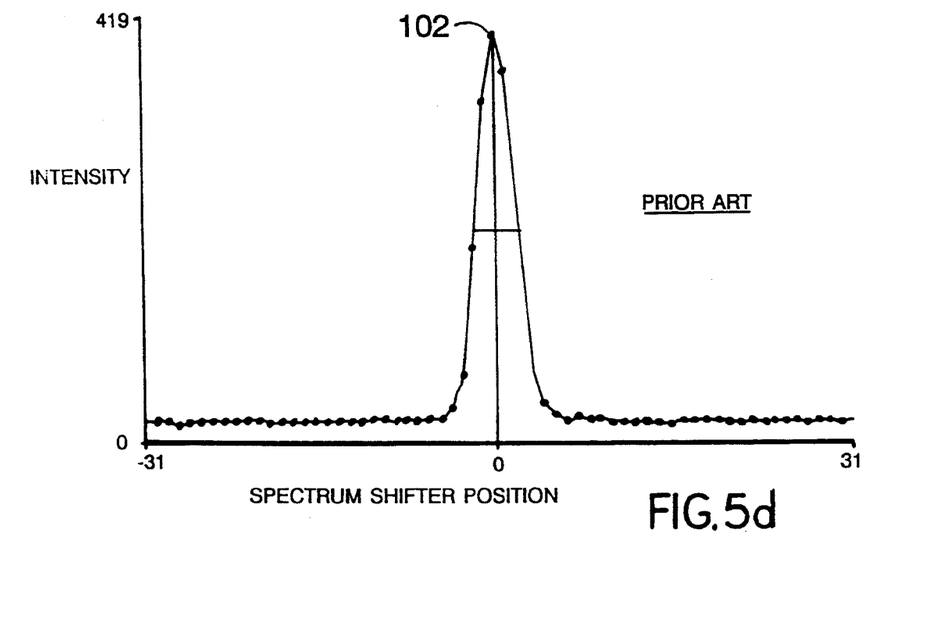
FIG. 5d is a graph of a spectroscopic scan of the same sample at the same wavelength as the scan of FIG. 5c with a prior art system that employed a "solar blind" photomultiplier tube.

Shown in FIG. 5c is a graph of a spectrographic scan of a sample of 10 parts per million nickel with the system employing a post disperser assembly. That scan produced a peak reading 100 of 1310 counts. Shown in FIG. 5d is a graph of a spectrographic scan of the same sample at the same wavelength with a polychromater in which the post disperser assembly was omitted and an R427 "solar blind" photomultiplier tube was used, the resulting FIG. 5d scan having a peak reading 102 of 384. The sensitivity of a system with a post disperser assembly was about three times that of a system with the more expensive "solar blind" photomultiplier tube.

In addition to separation of various orders of elemental lines, a system in accordance with the invention also reduces "far scatter" background, that is, radiation scattered from irregularities in the dispersive device. In reducing far scatter, the system reduces background radiation at the detector, thereby improving the sensitivity of the spectrometer. Although prism based spectrometers do not produce second order dispersion, the post dispersion assembly may be used with such spectrometers to reduce far scatter background effects.

Figure 6:
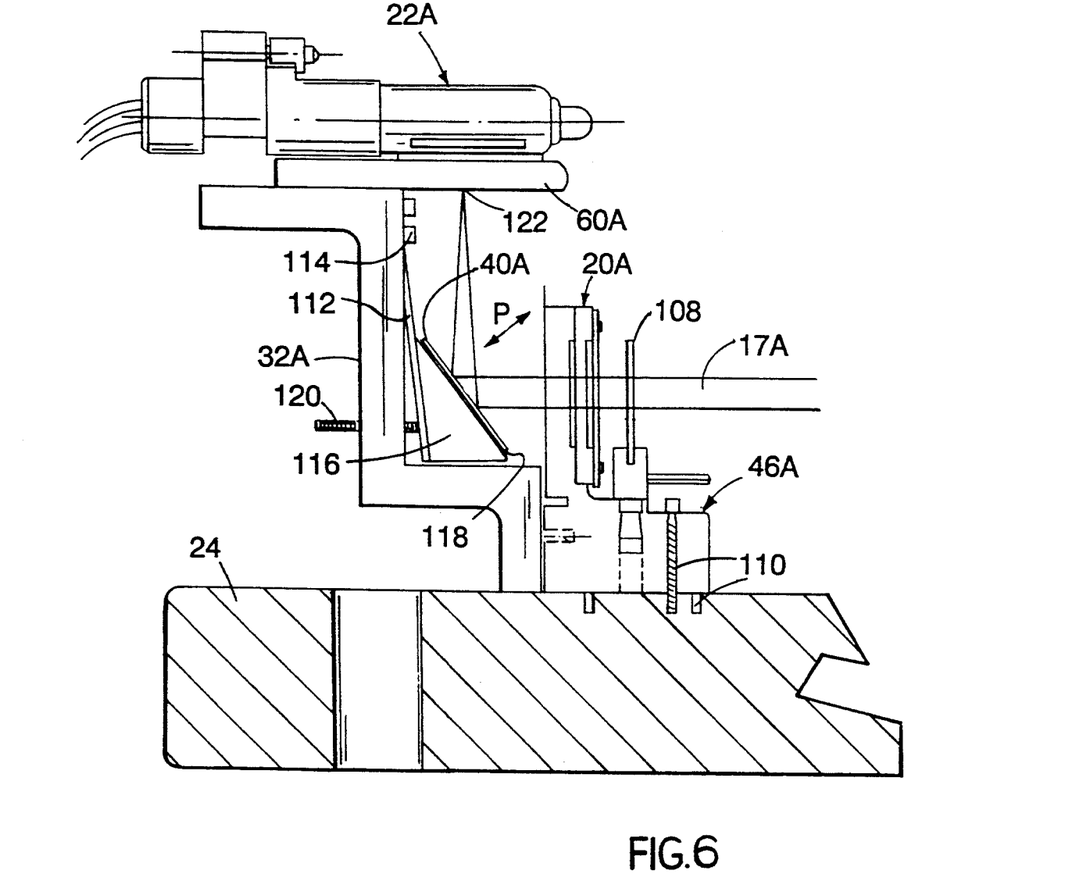
FIG. 6 is a view similar to FIG. 3 of another post disperser assembly in accordance with the invention.

Another post disperser assembly arrangement is shown in FIG. 6. That arrangement includes exit slit structure 20A mounted on support 46A that in turn is secured to focal curve structure 24 by pin and screw members 110. A refractor plate 108 is also mounted on support 46A. Bracket member 32A is mounted on support 46A and carries photomultiplier tube 22A and fixed mask structure 60A. Also mounted on bracket 32A is flexible sheet member 112 that is secured to bracket 32A by fasteners 114 and has aluminum block 116 secured at its lower end. Aluminum block 116 has a curved front surface 118 of about sixteen centimeters radius, and holographic reflection grating 40A (1,200 fringes per millimeter) is secured by adhesive to curved surface 118. Adjustment screw 120 also carried by bracket 32A moves support 116 and grating 40A in a direction as indicated by arrow P generally perpendicular to grating 40A. By movement of adjustment screw 120, the portion of the spectrum produced by grating 40A in response to radiation beam 17A passing through exit slit 20A is directed to the one millimeter wide fixed aperture 122 of mask 60A for sensing by photomultiplier tube 22A.

While particular embodiments of the invention have been shown and described, various modifications will be apparent to those skilled in the art, and therefore, it is not intended that the invention be limited to the disclosed embodiment, or to details thereof, and departures may be made therefrom within the spirit and scope of the invention.

What is claimed is:

1. A spectrometer system comprising entrance aperture defining structure for passing a beam of radiation from sample material excited to spectral emissive levels, dispersing structure for dispersing said beam of radiation, structure defining a plurality of exit apertures for concurrent passing of radiation dispersed by said dispersing structure at a number of different wavelengths, detector structure associated with each said exit aperture, and a post disperser assembly disposed between a said exit aperture and its associated detector structure, said post disperser assembly including a reflective diffraction grating disposed adjacent said exit aperture and mask structure disposed between said diffraction grating and its said detector structure.

2. The system of claim 1 wherein said grating has a radius of curvature in the range of five-fifty centimeters.

3. The system of claim 1 and further including adjustment structure for moving a component of said post disperser assembly relative to its said detector structure for changing the wavelength of radiation dispersed by said post disperser assembly that is sensed by its said detector structure.

4. The system of claim 3 wherein said adjustment structure is operable to move said diffraction grating relative to said detector structure.

5. The system of claim 3 wherein said adjustment structure is operable to move said mask structure relative to said detector structure.

6. A spectrometer system comprising:
housing structure,
entrance aperture defining structure in said housing structure for passing a beam of radiation from sample material excited to spectroemissive levels,
dispersing structure in said housing for dispersing radiation in said beam into a spectrum,
structure in said housing defining a plurality of exit apertures,
detector structure associated with each said exit aperture structure, and
a post disperser assembly in said housing disposed between a said exit aperture and its detector structure, said post disperser assembly including a curved reflective diffraction grating, mask structure, and structure for selecting a portion of the wavelength of radiation directed by said diffraction grating to its associated said detector structure, said selecting structure being adapted to move said mask structure relative to said detector structure for selecting a particular band of radiation passing through said associated exit aperture structure.

7. The system of claim 6 wherein said curved grating has a radius of curvature in the range of five-fifty centimeters.

8. The system of claim 6 wherein said detector structure includes a photomultiplier tube, and said diffraction grating has a radius of curvature of at least about five centimeters.

9. The system of claim 6 and further including bracket structure for supporting said grating, said bracket structure including a slot in its front wall and a transverse through aperture rearwardly of said slot that has a curved front surface against which said grating is seated.

10. The system of claim 6 wherein said grating is a holographic grating that has at least one thousand fringes per millimeter.

11. The system of claim 6 wherein said mask structure comprises a tubular outer member with aligned apertures in opposed lower and upper surfaces, a mask member disposed within said outer ember with an aperture of a length shorter than the length of the apertures in said tubular outer member biasing, structure secured to said mask member, and said selecting structure includes an adjusting screw for moving said mask member relative to said tubular outer member to shift the position of its said aperture relative to said detector structure.

12. The system of claim 6 wherein said dispersing structure and said exit aperture structure are located on a Rowland circle with each said post disperser assembly positioned at a location on said Rowland circle upon which first order radiation from a first element and second order radiation from a different element wavelength are incident.

13. The system of claim 12 wherein each said detector structure includes a photomultiplier tube.

14. The system of claim 13 wherein each said reflective diffraction grating is a holographic grating.

15. The system of claim 13 wherein each said reflective diffraction grating is a ruled grating.

16. A spectrometer system comprising:
housing structure,
entrance aperture defining structure in said housing structure for passing a beam of radiation from sample material excited to spectroemissive levels,
dispersing structure in said housing for dispersing radiation in said beam into a spectrum,
structure in said housing defining a plurality of exit apertures,
detector structure associated with each said exit aperture structure, and
a post disperser assembly in said housing disposed between a said exit aperture and its detector structure, said post disperser assembly including adjustable mask structure comprising a support member, a mask member that is disposed on said support member and has a through aperture, and biasing structure secured to said mask member, a curved reflective diffraction grating, and structure for selecting a portion of the wavelength of radiation directed by said diffraction grating to its associated said detector structure, said selecting structure including structure for moving said mask member to shift the position of its said aperture relative to said detector structure.

17. The system of claim 16 wherein said curved grating is a holographic grating that has at least one thousand fringes per millimeter and has a radius of curvature in the range of five-fifty centimeters.

18. A spectrometer system comprising:
housing structure,
entrance aperture defining structure in said housing structure for passing a beam of radiation from sample material excited to spectroemissive levels,
dispersing structure in said housing for dispersing radiation in said beam into a spectrum,
structure in said housing defining a plurality of exit apertures,
detector structure associated with each said exit aperture structure, and
a post disperser assembly in said housing disposed between a said exit aperture and its detector structure, said post disperser assembly including a curved reflective diffraction grating, and structure for selecting a portion of the wavelength of radiation directed by said diffraction grating to its associated said detector structure, said selecting structure including structure for moving said grating relative to said exit aperture structure for selecting a particular band portion of radiation passing through said associated exit aperture structure.

19. A spectrometer system comprising
dispersing structure for directing diffracted radiation on a Rowland circle, a plurality of exit slit structures at locations on said Rowland circle corresponding to predetermined wavelengths of said diffracted radiation,
detector structure associated with each said exit slit structure, each said detector structure including a photomultiplier tube, and a plurality of post disperser assemblies, each said post disperser assembly being disposed between a predetermined exit slit structure and its associated said detector structure, each said post disperser assembly comprising a reflective diffraction holographic grating that has at least one thousand fringes per millimeter and a radius of curvature in the range of five-fifty centimeters, such that first order wavelength radiation incident upon said diffraction from a first element and second order wavelength radiation from a second element at substantially the same wavelength as said first order wavelength radiation incident upon said diffraction grating are diffracted at different angles, and only one of said first and second wavelength orders of radiation is directed by said post disperser assembly upon said associated detector structure.

20. The system of claim 19 and further including bracket structure for supporting said grating, said bracket structure including a slot in its front wall and a transverse through aperture rearwardly of said slot that has a curved front surface against which said grating is seated.

* * * * *